(12) United States Patent
Sasaki

(10) Patent No.: US 9,322,369 B2
(45) Date of Patent: *Apr. 26, 2016

(54) AIR FILTER

(71) Applicant: Akira Sasaki, Menifee, CA (US)

(72) Inventor: Akira Sasaki, Menifee, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,787

(22) Filed: Oct. 2, 2013

(65) Prior Publication Data

US 2015/0089910 A1    Apr. 2, 2015

Related U.S. Application Data

(63) Continuation of application No. 11/096,815, filed on Mar. 31, 2005, now Pat. No. 8,574,332.

(51) Int. Cl.
*F02M 35/02* (2006.01)
*F02M 35/024* (2006.01)
*B01D 46/24* (2006.01)
*F02B 61/02* (2006.01)

(52) U.S. Cl.
CPC ......... *F02M 35/02458* (2013.01); *B01D 46/24* (2013.01); *F02M 35/024* (2013.01); *B01D 2275/10* (2013.01); *B01D 2275/201* (2013.01); *B01D 2275/403* (2013.01); *F02B 61/02* (2013.01)

(58) Field of Classification Search
CPC ....... B01D 50/00; B01D 59/50; F02M 35/024
USPC ............... 55/385.3, 315, 486; 123/198 E
See application file for complete search history.

(56) References Cited

U.S. PATENT DOCUMENTS

| 3,969,785 | A | * | 7/1976 | Ogawa et al. | 15/301 |
| 5,330,559 | A | * | 7/1994 | Cheney et al. | 95/63 |
| 6,464,761 | B1 | * | 10/2002 | Bugli | 96/135 |
| 8,574,332 | B2 | * | 11/2013 | Sasaki | 55/385.3 |

* cited by examiner

*Primary Examiner* — Duane Smith
*Assistant Examiner* — Minh-Chau Pham
(74) *Attorney, Agent, or Firm* — Tracy M Heims; Apex Juris, Pllc

(57) ABSTRACT

An air filter for a combustion engine for off-load motorcycles is made from a porous foam material. The air filter has contiguous side surface forming a cavity with at least two openings where the side surface contains at least one filter layer, a bottom surface closing at least one of the two openings where the bottom surface contains at least one filter layer, where the side surface has more air resistant than the bottom surface. The side surface has more air resistant than said bottom surface by arranging any combination of thickness of the surfaces, number of layers, and porosity ratio of the layers.

5 Claims, 6 Drawing Sheets

AIR FILTER

CROSS-REFERENCE TO APPLICATION AND CLAIM OF PRIORITY

This is a continuous in part application of U.S. Pat. No. 8,574,332B2, the disclosure of which are incorporated herein by reference.

BACKGROUND OF THE INVENTION

1. Field of the Invention

The present invention provides an improved air filter, or filter, for internal combustion engines and particularly adapted for use with motorcycles, the filter having different airflow resistance at different portions thereof.

2. Description of the Prior Art

Air filters designed for use with internal combustion engines have been available for many years. The air filter is typically installed in an air-filter case mounted beneath the seat and is connected to carburetor through the intake pipe.

Conventional air filters for off-road motorcycles are typically shaped as a conical frustum having a cavity opening at its inner section. The conventional air filter is typically made in a wet sponge format, i.e. foam sponge is immersed in viscous oil and then used with the air filter. In order to prevent reduced airflow due to dust deposits, the wet sponge filters utilize a double-layered structure wherein a coarse sponge is placed on the air filter outer layer and a covering a fine sponge placed as the inner layer. The sponges typically are the same thickness.

It is known that air filters are essential to protect the engine from dirt and sand in order to ensure its durability; engines having low ventilation resistance are considered desirable because airflow injected into the engine creates resistance. Current air filters seek the ability to block dirt and sand and injected air resistance, airflowing evenly from many directions at the same time. In this regard, and referring to FIGS. 7-9, conventional air filter 50 utilizes different sponges 51 and 52 for its outer and inner layers, each sponge being made of the same material and of the same thickness for the entire surface area. This allows the same amount of air to flow into the air filter 50 from all surface areas. That in turn causes the air 51 flowing from the side-surface section to collide with the air 52 flowing from the bottom surface section on the inside of the air filter 50 causing air turbulence. As a result the air intake to the engine decreases, decreasing engine efficiency.

U.S. Pat. No. 4,039,308 to Schiff (Schiff) discloses a device formed of rigid foam material which functions both to filter and straighten air introduced thereto prior to being directed to the vehicle air intake. Specifically, the device comprises an integral air filter and air straightening means made of the same porous material. The air straightening means performs two functions, i.e. that of cleaning air introduced thereto in a manner similar to that accomplished by an air filter while also reducing the turbulence of the cleaned air before being introduced to an air intake device, such as a carburetor.

Although the air fitters disclosed in the conventional arts, such as illustrated in Schiff, provide an increased flow of cleaned air at the air intake of the internal combustion engine, the airflow comprises two components having two different velocity vectors; the resultant mixed airflow reducing the total amount of useful airflow to the air intake, thus reducing engine efficiency. What is desired is to provide a simple, yet cost efficient, light weight air filter that creates increased airflow into the engine, thus increasing engine efficiency.

SUMMARY OF THE INVENTION

The present invention provides an air filter having different airflow resistance at different portions thereof. The airflow resistance through the side section of the filter is different from the airflow resistance through the bottom-surface section of the air filter.

The present invention controls the desired airflow resistance by selecting the appropriate number of layers, the appropriate thickness, and the appropriate porous ratio of the filter materials that comprise the side-surface section and bottom surface section of the air filter.

The air filter of the present invention protects the engine from dirt and sand so as to ensure its durability and, at the same time, offers a measure of resistance to the flow of intake air to the engine. Traditionally, it has been regarded that an air filter with less resistance is preferable, so that the air filter has been the product of a compromise between the ability to prevent dirt and sand from entering the engine and the resistance to the intake airflow.

The present invention increases the amount of intake airflow volume and increases the engine's output power by controlling the smoothing airflow within the air filter as the result of a relative difference in the airflow resistances provided through the side-surface section and the bottom surface section of the air filter and maximizing engine output power.

DESCRIPTION OF THE DRAWINGS

For a better understanding of the present invention as well as other objects and further features thereof reference is made to the following description which is to be read in conjunction with the accompanying drawing therein.

DESCRIPTION OF THE INVENTION

Figure 1:
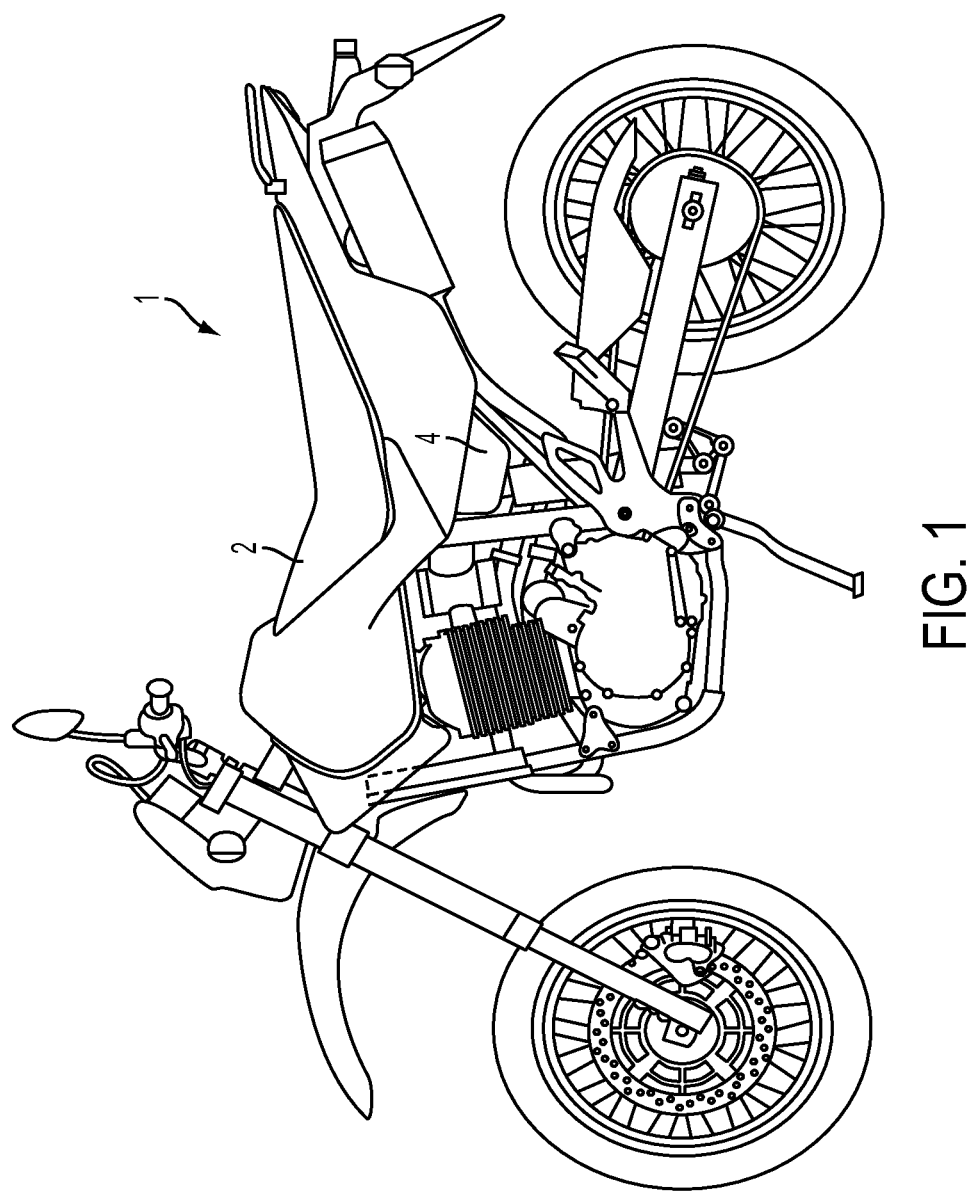
FIG. 1 is a perspective view of a motorcycle incorporating the teachings of the present invention.
Figure 2:
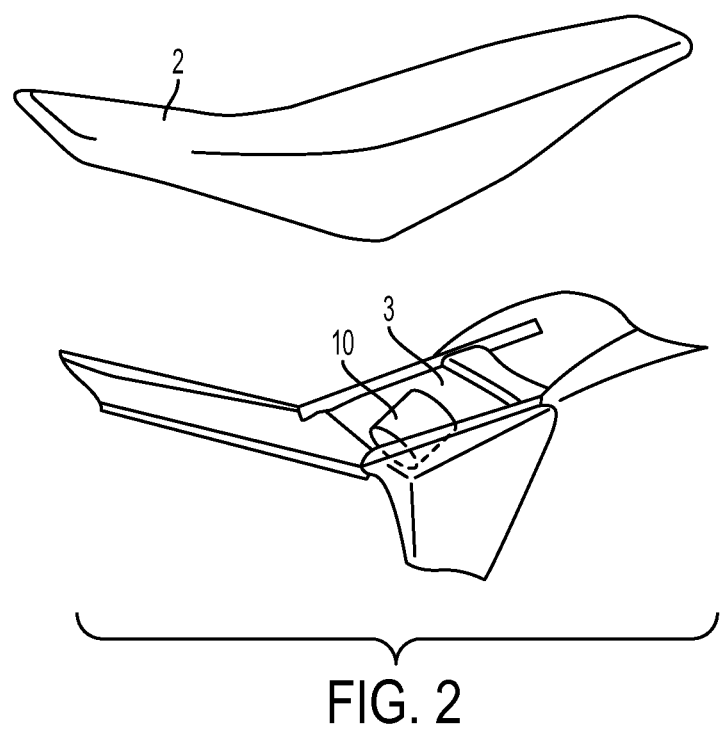
FIG. 2 is a view showing the motorcycle seat section and the location of the air filter of the present invention.

FIG. 1 is a left-side view of a motorcycle 1 illustrating a seat section 2 and an intake pipe 4, and FIG. 2 is a perspective view of the seat section 2 removed from the motorcycle 1 showing an air filter case 3 mounted underneath the seat section 2 of the motorcycle 1. In the front section of the air filter case 3, a conical frustum shaped air filter 10, which is described hereinafter, is installed with its upper flat surface facing frontward. It should be noted that other shapes for the air filter can be used. In addition, the air filter may be located in positions other than below the seat. The intake pipe 4 is connected to the flat surface section. The rear-end section of the air filter case 3 has an opening (not shown). The airflows through this opening, and the air filter 10 removes dirt and sand from the air. The air is then sent to the carburetor (not shown) via the intake pipe 4.

Figure 3:
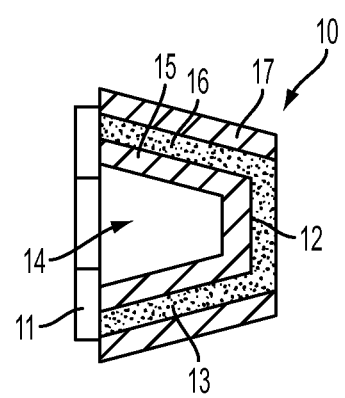
FIG. 3 is a cross-sectional view of a first embodiment of the air filter of the present invention.

FIG. 3 is a cross-sectional view of the first embodiment of this invention pertaining to the air filter of the present invention. The air filter 10 is illustrated as shaped as a conical frustum. The interior section has a cavity opening 14, which faces an upper flat surface 11. The air filter 10 is made of a foam material such as foam urethane. In this embodiment, the air filter 10 is structured as two layers such that a foam material layer 16 covers a side surface section 13 and a bottom surface section 12 of a foam material 15 that has the center cavity section 14. Additionally, the side surface section 13 is structured as three layers, where a foam material layer 17 covers the outer surface of the foam material layer 16. Additionally, the foam material layer 15, the foam material 16 and the foam material layer 17 are made of the same basic material and of the same thickness. However, as compared to the foam material layer 15, the foam material 16 and the foam material 17 have a coarse foaming ratio. Foaming ratio as herein defined relates to the size, or diameter, of the openings in each foam layer.

Figure 4:
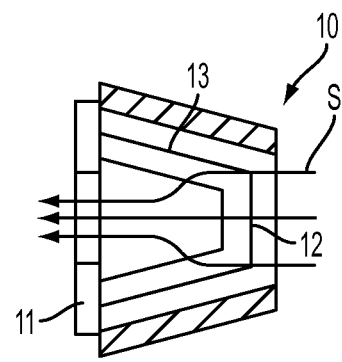
FIG. 4 illustrates airflow through the air filter of the present invention.

FIG. 4 shows the airflow within the air filter 10. In this embodiment of the invention, the air filter 10 is structured in three layers at the side surface 13 and has a larger airflow resistance as compared to the bottom surface 12 section, where it is structured as two layers. As a result, the airflow "S" into the air filter 10 is only from the bottom surface 12, not from the side surface 13, thereby resulting in smooth, straight airflow and an increased volume of intake airflow. When the volume of intake airflow increases, the volume of fuel injection is also increased at the same ratio in order to maintain combustion efficiency. This combined increase in air intake volume and fuel injection volume produces a relative increase in engine output power.

Figure 5:
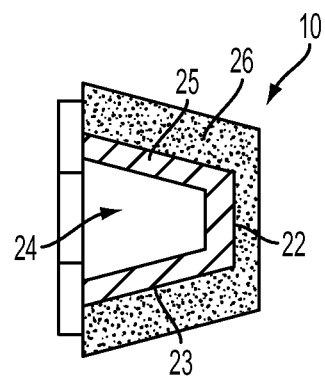
FIG. 5 is a cross-sectional view of a second embodiment of the air filter of the present invention.

FIG. 5 is a cross-sectional view of a second embodiment of the air filter of the present invention. In this embodiment, an air filter 20 has a side surface 23 in combination of a first layer 25 and a second layer 26 that covers the outer surface of the first side layer 25, a bottom surface 22 in combination of the first layer 25 and the second layer 26, and a center cavity opening 24. The air filter 20 is illustrated as shaped as a conical frustum. The air filter 20, in this embodiment, is shaped in conical frustum that is thicker at the side surface section 23 as compared to the thickness at the bottom surface 22 section. Therefore, the airflow resistance at the side surface 23 is greater than it is at the bottom surface 22. The result is a smooth, straight flow of air and a relative increase in the volume of intake airflow. Additionally, the foam material layer 25 and the foam material layer 26 are made of the same basic material. However, as compared to the foam material 25, the foam material layer 26 has a coarse foaming ratio.

Figure 6:
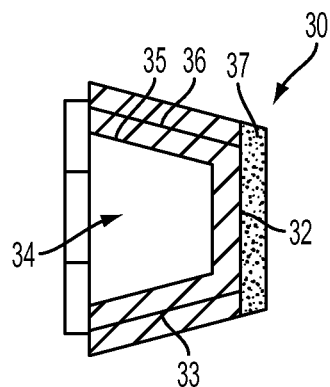
FIG. 6 is a cross-sectional view of a third embodiment of the air filter of the present invention.
Figures 7A, 7B:
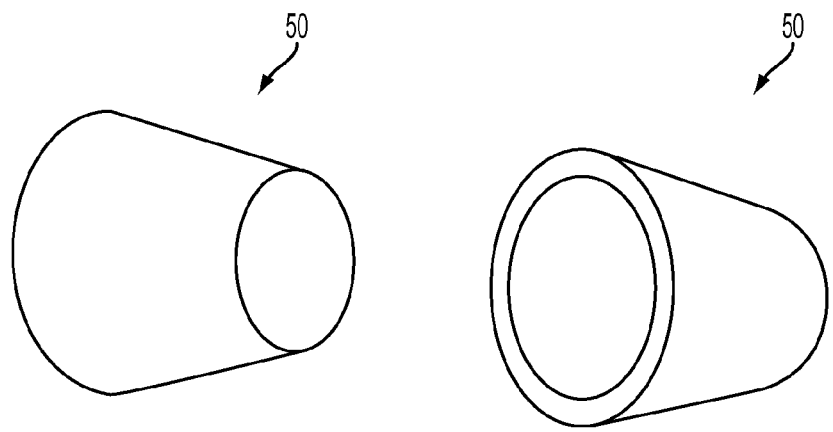
FIG. 7 is a perspective view of a prior art.
Figure 8:
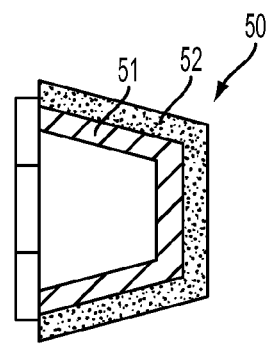
FIG. 8 is a cross-sectional view of FIG. 7.
Figure 9:
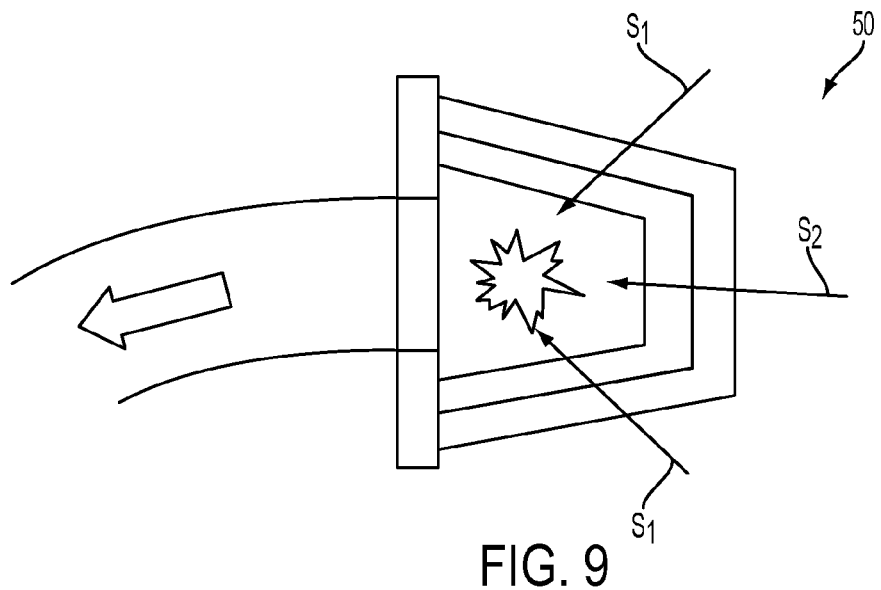
FIG. 9 is a cross-sectional view of FIG. 7 showing the airflow and collision of the airflow.

FIG. 6 is a cross-sectional view of a third embodiment of the air filter of the present invention. In this embodiment, an air filter 30 has a side surface 33 in combination of a first layer 35 and a second layer 36 that covers the outer surface of the first side layer 35, a bottom surface 32 in combination of the first layer 35 and a bottom second layer 37, and a center cavity opening 34. The air filter 30 is illustrated as shaped as a conical frustum. The air filter 30 has the second layer 36, which covers the first side layer 35, which in turn shapes the center cavity opening 34 of the conical frustum, has a finer foaming ratio than the bottom second layer 37 that covers the bottom surface 32 section of the first side layer 35. Therefore, the airflow resistance at the side surface 33 is greater than the airflow resistance at the bottom surface 32. The result is a smooth, straight flow of air and a relative increase in the volume of intake airflow. Additionally, foam material layer 35, foam material layer 36 and foam material 37 have the same thickness.

Figure 10:
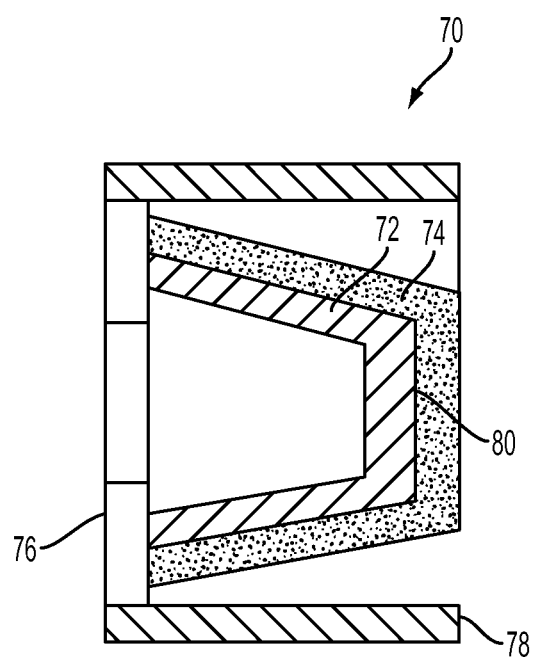
FIG. 10 is a fourth embodiment of the air filter of the present invention.

FIG. 10 is a cross-sectional view of a fourth embodiment of the present invention. In particular, an air filter 70 has an outer layer 74 covering an inner layer 72 and a bottom flat surface 76. The air filter 70 is illustrated as shaped as a conical frustum. A circumferential plate 78, preferably made of a plastic material, is positioned at the outer perimeter external wall of outer layer 74 and functions to minimize the airflow entering into the air filter through outer layer 74 while maximizing the airflow through the bottom surface section 80.

Figure 11:
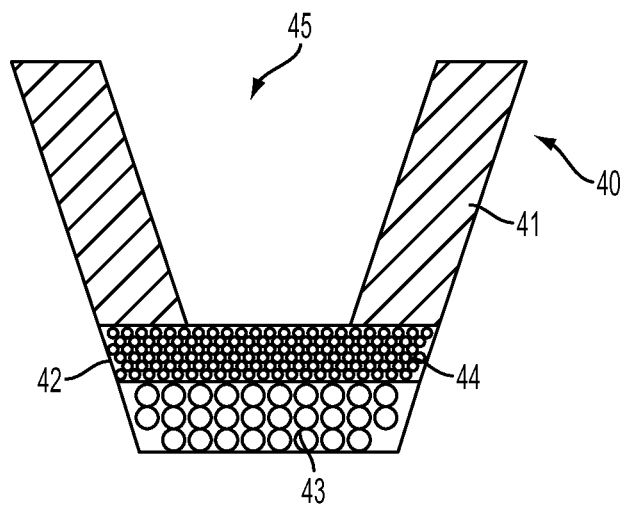
FIG. 11 is a cross-sectional view of fifth embodiment of the present invention.

FIG. 11 is a cross-sectional view of a fifth embodiment of the present invention. In this embodiment, an air filter 40 has a side surface 41, a bottom surface 42 including a first bottom layer 43 and a second bottom layer 44, and a center cavity opening 45. The air filter 40 is illustrated as shaped as a conical frustum. The side surface 41 and the bottom layer 42 are made of porous material, where the side surface 41 has a finer porous ratio than the bottom surface 42. The second bottom layer 44 has a finer porous ratio than the first bottom layer 43. Therefore, the airflow resistance at the side surface 41 is greater than the airflow resistance at the bottom surface 42. The result is a smooth, straight flow of air and a relative increase in the volume of intake airflow. Thickness of the side surface 41 and the bottom surface 42 may be modified as necessary as long as the airflow resistance at the side surface 41 is greater than the airflow resistance at the bottom surface 42.

Figure 12:
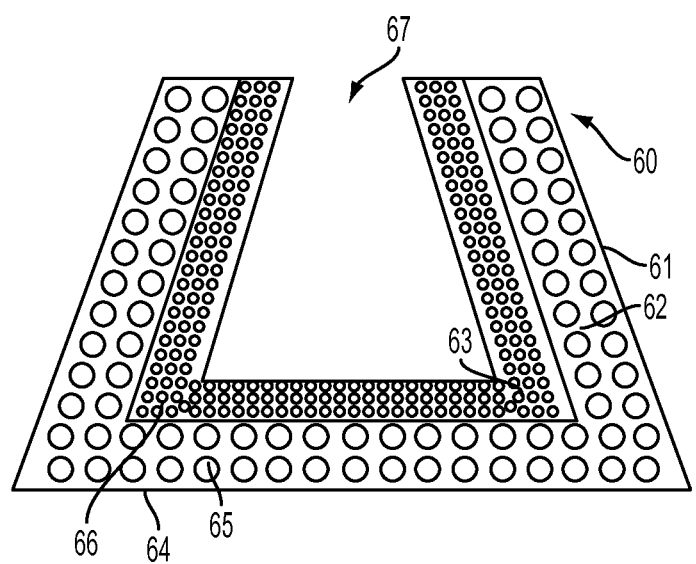
FIG. 12 is a cross-sectional view of sixth embodiment of the present invention.

FIG. 12 is a cross-sectional view of a sixth embodiment of the present invention. An air filter 60 has a side surface 61 including a first side layer 62 and a second side layer 63, an bottom surface 64 including a first bottom layer 65 and a second bottom layer 66, and a center cavity opening 67. In this embodiment, the shape of the air filter 60 is reverse-conical frustum relative to the previous embodiments. The side surface 61 and the bottom layer 64 are made of porous material, where the first side layer 62 and the first bottom layer 65 have a finer porous ratio than the second side layer 63 and the second bottom layer 66. The side surface 61 is thicker than the bottom surface 64, and each layer can be designed so that the airflow resistance at the side surface 61 is greater than the airflow resistance at the bottom surface 64. The result is a smooth, straight flow of air and a relative increase in the volume of intake airflow. Thickness of the side surface 61 and the bottom surface 64 may be modified as necessary as long as the airflow resistance at the side surface 61 is greater than the airflow resistance at the bottom surface 64.

Even though the number of layers, the thickness and the foaming ratio of the foam materials are varied independently in order to modify the airflow resistance in the embodiments noted hereinabove, in actual implementation any combination of these factors can be utilized. In the embodiments described above, the airflow resistance through the side surface is increased relative to the bottom surface. However, it is also acceptable to increase the airflow resistance through the bottom surface as compared to the side surface. The point to note is that to create a smooth, straight flow of air within the air filter, different thicknesses at the bottom and side surfaces are provided.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. Air filter for a combustion engine for off-load motorcycles, comprising:
    a contiguous side surface forming a cavity with at least two openings where said side surface contains at least one filter layer,
    a bottom surface closing at least one of said two openings where said bottom surface contains at least one filter layer, wherein
    said side surface has more air resistant than said bottom surface to increase an amount of intake airflow volume and an engine's output power by controlling a smooth airflow within the air filter.

2. The air filter for a combustion engine for off-load motorcycles according to claim 1, wherein
    said side surface is thicker than said bottom surface to generate more air resistance.

3. The air filter for a combustion engine for off-load motorcycles according to claim 1, wherein
    said side surface has more layers than said bottom surface to generate more air resistance.

4. The air filter for a combustion engine off-load motorcycles according to claim 1, wherein
    said side surface has finer porosity ratio than said bottom surface to generate more air resistance.

5. The air filter for a combustion engine according to claim 1, wherein
    said side surface has more air resistant than said bottom surface by arranging any combination of thickness of the surfaces, number of layers, and porosity ratio of the layers.

* * * * *